(12) United States Patent
Li et al.

(10) Patent No.: US 10,774,753 B2
(45) Date of Patent: Sep. 15, 2020

(54) INDIRECT MONITORING OF AIRCRAFT COMBUSTOR DYNAMICS

(71) Applicant: General Electric Company, Schenectady, NY (US)

(72) Inventors: Hejie Li, Mason, OH (US); Daniel Roy Kiracofe, Cincinnati, OH (US); Inenhe Mohammed Khalid, Hamilton, OH (US); Jason Scott Dangel, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 832 days.

(21) Appl. No.: 15/299,926

(22) Filed: Oct. 21, 2016

(65) Prior Publication Data

US 2018/0112601 A1    Apr. 26, 2018

(51) Int. Cl.

| | |
|---|---|
| *F02C 9/28* | (2006.01) |
| *F01D 21/00* | (2006.01) |
| *F23R 3/00* | (2006.01) |
| *G01H 1/00* | (2006.01) |
| *F23N 5/24* | (2006.01) |
| *F02C 3/04* | (2006.01) |
| *F01D 25/04* | (2006.01) |

(52) U.S. Cl.
CPC .............. *F02C 9/28* (2013.01); *F01D 21/003* (2013.01); *F01D 25/04* (2013.01); *F23N 5/24* (2013.01); *F23R 3/00* (2013.01); *G01H 1/003* (2013.01); *F02C 3/04* (2013.01); *F05D 2260/80* (2013.01); *F05D 2260/964* (2013.01); *F05D 2270/14* (2013.01); *F05D 2270/334* (2013.01); *F23R 2900/00013* (2013.01); *Y02T 50/671* (2013.01)

(58) Field of Classification Search
CPC .......... F02C 9/28; F01D 25/04; F01D 21/003; F05D 2260/96; F05D 2260/964; F05D 2260/80; F05D 2270/14; F05D 2270/334; F23N 5/24; F23N 5/242; F23N 2025/04; G01M 15/12; G01M 15/14; G01H 1/00; G01H 1/003
See application file for complete search history.

(56) References Cited

U.S. PATENT DOCUMENTS

4,967,550 A * 11/1990 Acton ............... F01D 25/06
                                                          415/119
5,665,916 A    9/1997 Puster et al.
(Continued)

*Primary Examiner* — Alain Chau
(74) *Attorney, Agent, or Firm* — Dority & Manning, P.A.

(57) ABSTRACT

Systems and methods for indirect monitoring of combustor dynamics in a gas turbine engine include collecting vibration data acquired by a vibration sensor, which is mounted proximate to an operational component positioned relative to a combustor of a gas turbine engine. The vibration data can be transformed into a frequency domain representation at periodic intervals. The relative signal strength of the vibration data can be determined over the one or more identified frequency bands. The relative signal strength can be adjusted with hysteresis at each of the one or more identified frequency bands. Occurrence of a combustor dynamics event at one or more specific resonant frequencies can be determined based at least in part on evaluation of the adjusted relative signal strength relative to one or more event detection threshold levels.

17 Claims, 5 Drawing Sheets

(56) References Cited

U.S. PATENT DOCUMENTS

| | | | |
|---|---|---|---|
| 5,719,791 A * | 2/1998 | Neumeier | F23N 5/16 700/274 |
| 5,784,300 A * | 7/1998 | Neumeier | F23N 5/16 381/71.1 |
| 5,797,266 A | 8/1998 | Brocard et al. | |
| 6,354,071 B2 | 3/2002 | Tegel et al. | |
| 6,530,228 B2 | 3/2003 | Wilson et al. | |
| 6,601,393 B2 * | 8/2003 | Wilson | F23N 5/16 60/776 |
| 6,640,549 B1 | 11/2003 | Wilson et al. | |
| 6,839,613 B2 | 1/2005 | McCarthy et al. | |
| 6,922,612 B2 * | 7/2005 | Nomura | F23N 5/16 700/274 |
| 6,973,791 B2 | 12/2005 | Handelsman et al. | |
| 7,075,424 B1 * | 7/2006 | Sundaresan | G01N 29/14 340/500 |
| 7,200,487 B2 | 4/2007 | Ancimer | |
| 7,210,297 B2 * | 5/2007 | Shah | F02C 9/28 60/772 |
| 7,334,413 B2 | 2/2008 | Myhre | |
| 7,406,820 B2 | 8/2008 | Critchley et al. | |
| 7,503,177 B2 | 3/2009 | Bland et al. | |
| 7,584,617 B2 | 9/2009 | Bland et al. | |
| 7,775,052 B2 | 8/2010 | Cornwell et al. | |
| 7,853,433 B2 | 12/2010 | He et al. | |
| 7,966,801 B2 | 6/2011 | Umeh et al. | |
| 7,997,083 B2 * | 8/2011 | Meadows | F01D 21/003 60/39.281 |
| 8,126,629 B2 * | 2/2012 | Buchalter | F02C 9/26 701/100 |
| 8,240,120 B2 * | 8/2012 | Southwick | F01D 21/04 60/39.091 |
| 8,417,433 B2 | 4/2013 | Gauthier et al. | |
| 8,437,941 B2 | 5/2013 | Chandler | |
| 8,485,309 B2 | 7/2013 | Busse et al. | |
| 8,504,276 B2 * | 8/2013 | Martling | F02C 9/28 701/100 |
| 8,752,434 B2 | 6/2014 | Johansson | |
| 8,818,683 B2 * | 8/2014 | van der Merwe | F01D 21/003 701/100 |
| 8,831,860 B2 * | 9/2014 | Carratt | G01M 15/12 701/111 |
| 9,097,185 B2 * | 8/2015 | Demougeot | F02C 9/34 |
| 9,328,670 B2 | 5/2016 | Chandler | |
| 9,404,426 B2 * | 8/2016 | Wichmann | F02C 9/50 |
| 9,551,283 B2 * | 1/2017 | Crothers | F02C 7/22 |
| 2002/0005037 A1 * | 1/2002 | Tegel | F01D 17/08 60/772 |
| 2002/0103547 A1 * | 8/2002 | Nomura | F02C 9/18 700/29 |
| 2002/0162334 A1 * | 11/2002 | Wilson | F02C 9/28 60/776 |
| 2003/0066352 A1 * | 4/2003 | Leamy | F01D 21/00 73/593 |
| 2004/0011020 A1 * | 1/2004 | Nomura | F01D 17/162 60/39.281 |
| 2005/0114082 A1 * | 5/2005 | Kant | F01D 21/20 702/183 |
| 2007/0250245 A1 * | 10/2007 | van der Merwe | F01D 21/045 701/100 |
| 2009/0110541 A1 * | 4/2009 | Southwick | F01D 21/04 415/119 |
| 2010/0117859 A1 * | 5/2010 | Mitchell | F01D 17/02 340/870.16 |
| 2010/0158670 A1 | 6/2010 | Fox | |
| 2011/0239621 A1 | 10/2011 | Meneely et al. | |
| 2011/0276247 A1 * | 11/2011 | Carratt | G01M 15/14 701/100 |
| 2012/0279229 A1 * | 11/2012 | Zinn | F02C 9/48 60/773 |
| 2013/0139578 A1 | 6/2013 | Hoehne et al. | |
| 2013/0291552 A1 | 11/2013 | Smith et al. | |
| 2013/0326383 A1 * | 12/2013 | Gatti | F01D 21/003 715/771 |
| 2014/0137564 A1 * | 5/2014 | Scipio | F02C 9/00 60/775 |
| 2015/0268120 A1 | 9/2015 | Sadig et al. | |
| 2016/0032853 A1 | 2/2016 | Huang et al. | |
| 2016/0146118 A1 * | 5/2016 | Wichmann | F01D 21/003 701/100 |

\* cited by examiner

INDIRECT MONITORING OF AIRCRAFT COMBUSTOR DYNAMICS

FIELD OF THE INVENTION

The present subject matter relates generally to engine control systems for analyzing vibration sensor outputs to monitor combustor dynamics, and more particularly, to engine control systems for analyzing vibration sensor outputs for indirect monitoring of combustor dynamics in aircraft gas turbine engines.

BACKGROUND OF THE INVENTION

Lean burn combustors, such as those used on modern aircraft engines, are susceptible to combustion dynamics. Under certain engine operating conditions, significant transient pressure waves ("pings") can be present, particularly in an annular combustor. These pressure waves, if of sufficient magnitude, can cause high cycle fatigue of combustor components, long before the hardware would need to be replaced under normal operations.

One known approach to combustor dynamic issues can involve careful mapping of problem regimes using test engines with multiple combustor instrumentation pressure sensors. Aircraft fuel schedules developed from this process and subsequently programmed into engine control were expected to avoid all problem areas. Despite this mapping, subtle changes to an engine still can adversely affect combustion dynamics behavior. These changes can be due to parameters including manufacturing variations, engine deterioration, fuel composition, or unexpected flight conditions.

Other known approaches for monitoring combustor dynamics have been taken in marine and industrial turbine engines. For example, dedicated pressure sensors have been used to optimize fuel consumption and minimize emissions and occurrences of combustor acoustic resonance. Hardware resonators are sometimes added to mitigate specific modes in commonly used power regions for marine and industrial turbine engines. Such pressure sensors, hardware resonators and other related components introduce additional size and weight that may not be tolerable for an aviation engine. Combustor geometry is also significantly different in marine and industrial engines, so mode shapes and interactions are not directly applicable to an aviation application.

Specific aspects of combustor dynamics modeling in marine and industrial applications are often designed with different operational targets than for aircraft applications. For instance, marine and industrial turbine engines are typically run at a small number of operating points under steady state conditions for long periods of time. The sensors and monitoring logic are therefore set up for long-term averaging and slow response times, which may not always be ideal for aircraft applications. In some examples, sensors employ control logic that has a response time in a range from about a few seconds to as long as a minute or more for fuel control changes to mitigate resonance. Monitoring can use straightforward filtering to calculate a peak resonance value in one or two broadband areas, which is then fed back into the control logic. This approach does not attempt to pinpoint a specific frequency of the resonant mode(s) being excited.

Accordingly, features for monitoring combustion dynamics in aircraft engines are desired. Specifically, features for observing engine dynamics during transient engine operation in real time in order to identify specific resonant frequencies are desired.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a method for indirect monitoring of combustor dynamics in a gas turbine engine includes collecting, by one or more processors, vibration data acquired by a vibration sensor. The vibration sensor can be mounted proximate to an operational component positioned relative to a combustor of a gas turbine engine. The vibration data can be transformed by the one or more processors into a frequency domain representation at periodic intervals. The relative signal strength of the vibration data can be determined by the one or more processors over the one or more identified frequency bands. Occurrence of a combustor dynamics event at one or more specific resonant frequencies can be determined by the one or more processors based at least in part on evaluation of the relative signal strength relative to one or more event detection threshold levels.

Other example aspects of the present disclosure are directed to systems, apparatus, tangible, non-transitory computer-readable media, memory devices, and electronic devices for indirectly monitoring gas turbine combustor dynamics.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for indirect monitoring of combustor dynamics events using vibration data. Vibration data can be acquired from a vibration sensor such as a vibration-sensing accelerometer positioned relative to a combustor within a gas turbine engine, which can correspond in some examples to a turbofan, turboprop, turbojet, or turboshaft engine such as used in various aircraft applications. The vibration data can be processed to determine an operational parameter relative to turbine unbalance, while also processed within one or more frequency bands of interest to determine an occurrence of one or more combustor dynamics events. Combustor dynamics events can be determined at one or more specific resonant frequencies based at least in part on an evaluation of the processed vibration data relative to one or more event detection threshold levels. Determined combustor dynamics events then can be used to improve engine operations in one or more ways, such as by adjusting a fuel schedule for the engine and/or detecting an engine action trigger event.

Some example systems and methods for indirect monitoring of combustor dynamics can involve more particular features for processing acquired vibration data. For example, the vibration data obtained from a vibration sensor can be digitized and then transformed into a frequency domain representation at periodic intervals. Relative signal strength (RSS) can be determined over one or more frequency bands with optional adjustments made for hysteresis effects. The RSS and hysteresis values can be further evaluated relative to the one or more event detection threshold levels to determine combustor dynamics event occurrence.

Example aspects of the present disclosure can provide many advantages. For example, utilization of combustor dynamics monitoring in accordance with example embodiments can have a technical effect of providing sensing capabilities on flights by detecting, monitoring and correcting combustor dynamics events in real time. Capabilities are afforded for monitoring of short-term (e.g., sub-1-second) events that can be of critical during aircraft operation. Features can be provided for identifying specific resonant frequencies as opposed to broadband energy content. Solutions can be oriented towards the full power range and full flight envelope operating conditions of an aircraft instead of a narrow power range operating region typical for marine and industrial applications. Improvements can be provided for transient engine operation of aviation engines rather than steady state operating focus of marine and industrial applications.

Systems and methods are provided that make efficient use of existing aircraft hardware without the requirement of additional dedicated pressure sensors, hardware resonators, or other components. Continuous monitoring of combustion dynamics throughout the full flight cycle indirectly using existing engine sensors provides sufficient fidelity for sensing multiple combustion dynamics modes. For fleet installation, a single multi-purpose sensor for detecting combustor modes can provide a substantial benefit with enhanced cost, weight and detection flexibility. This provides for development of either open-loop or closed-loop fuel schedules that avoid or minimize operation in potentially damage-causing operating regimes.

Figure 1:
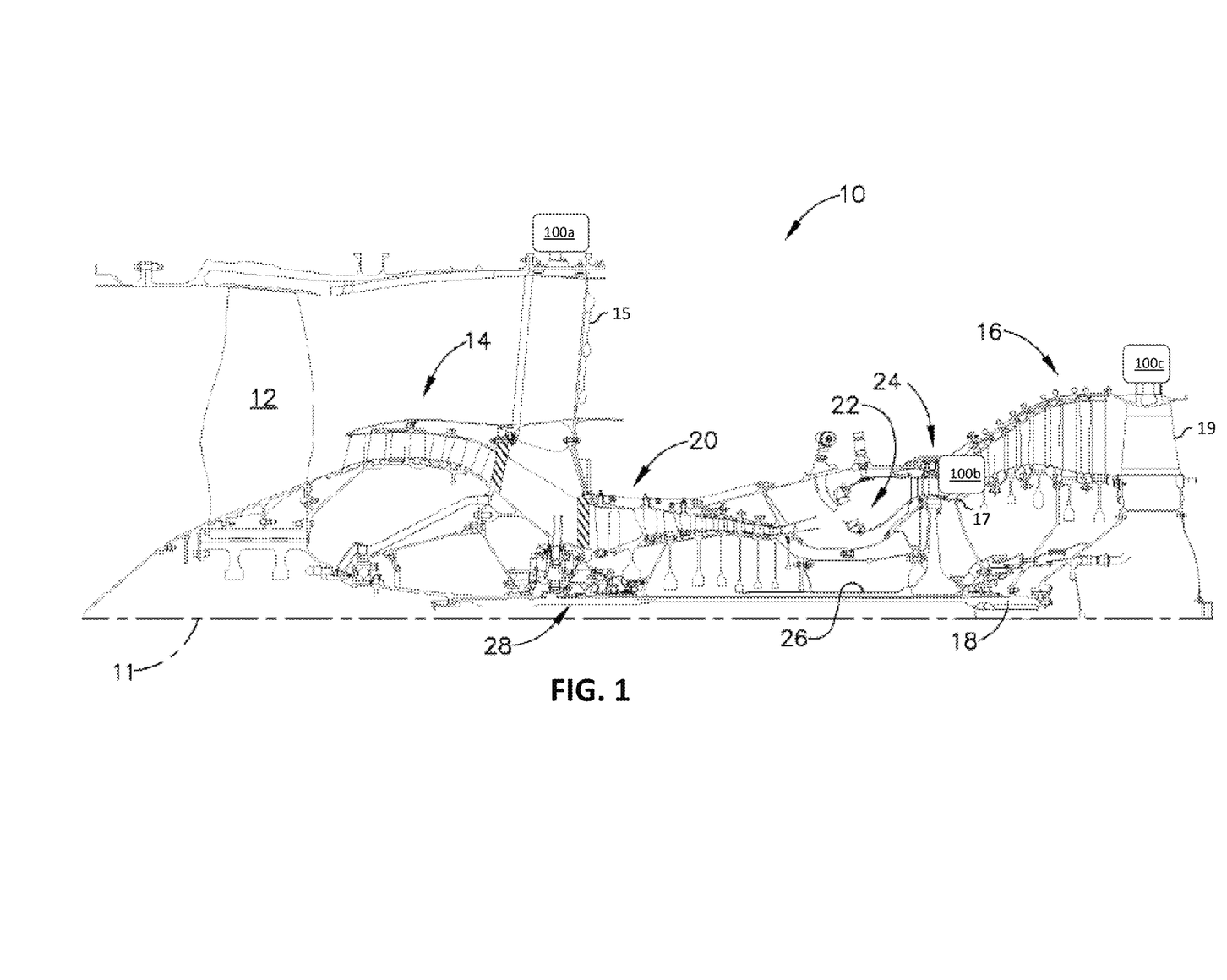
FIG. 1 is a schematic cross-sectional view of an exemplary gas turbine engine according to various embodiments of the present subject matter.
Figure 2:
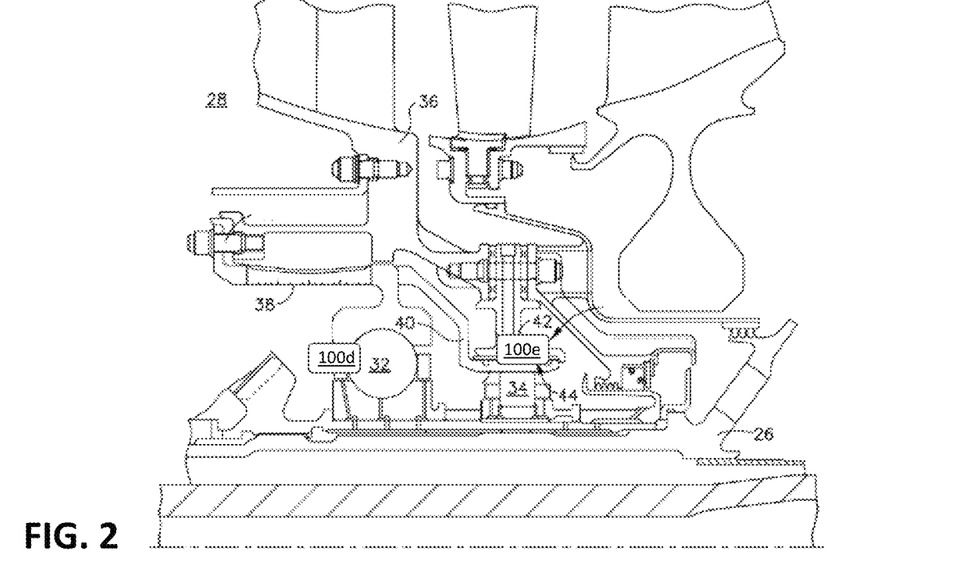
FIG. 2 is a schematic, cross-sectional view of a forward end of a core of the exemplary gas turbine engine of FIG. 1 according to various embodiments of the present subject matter.
Figure 3:
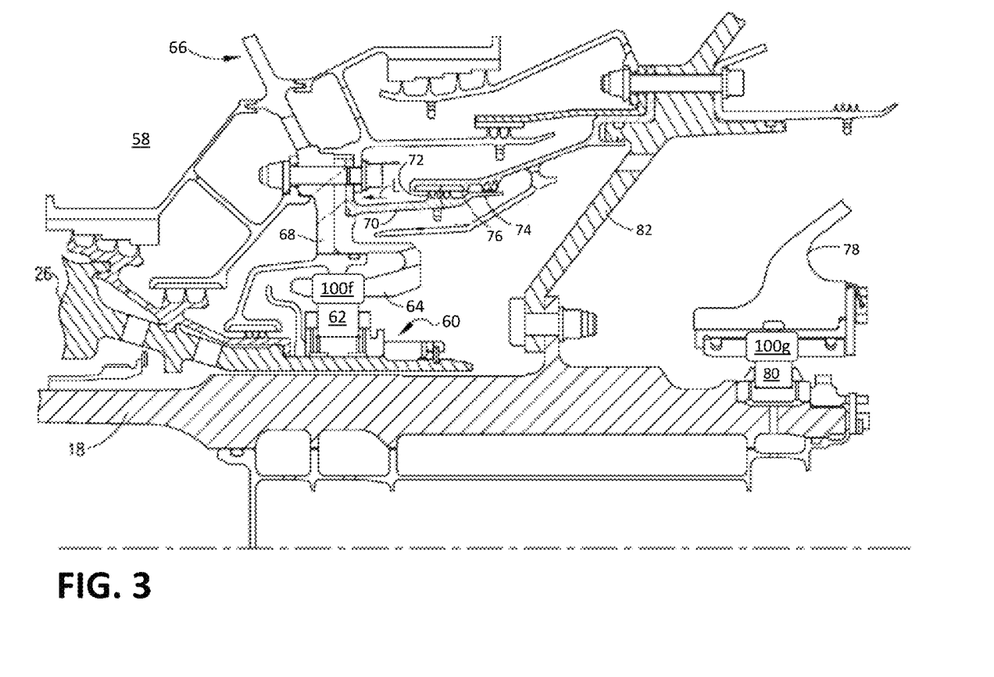
FIG. 3 is a schematic, cross-sectional view of an aft end of a core of the exemplary gas turbine engine of FIG. 1 according to various embodiments of the present subject matter.

Referring now to the figures, it should be appreciated that embodiments of the disclosed technology concern gas turbine engines including indirect combustor dynamics monitoring technology. Example aspects of such gas turbine engines are depicted in FIGS. 1-3, respectively, including example locations for a vibration sensor used to obtain signal data processed in accordance with the disclosed technology. Vibration sensors such as accelerometers for sensing vibrational data can be placed proximate to one or more frame components of a gas turbine engine, such as depicted in FIG. 1. Vibration sensors for sensing vibrational data can additionally or alternatively be placed proximate to one or more bearings of a gas turbine engine, such as depicted in FIGS. 2 and 3.

FIG. 1 illustrates one embodiment of an example gas turbine engine 10 which can incorporate various aspects of the disclosed technology. Gas turbine engine 10 has a longitudinal axis 11 and includes a fan 12, a low pressure compressor or "booster" 14 and a low pressure turbine ("LPT") 16 collectively referred to as a "low pressure system." The LPT 16 drives the fan 12 and booster 14 through an inner shaft 18, also referred to as an "LP shaft." The engine 10 also includes a high pressure compressor ("HPC") 20, a combustor 22, and a high pressure turbine ("HPT") 24, collectively referred to as a "gas generator" or "core." The HPT 24 drives the HPC 20 through an outer shaft 26, also referred to as an "HP shaft." Together, the high and low pressure systems are operable in a known manner to generate a primary or core flow as well as a fan flow or bypass flow. The inner and outer shafts 18 and 26 are mounted for rotation in several rolling-element bearings. The bearings are located in enclosed portions of the engine 10 referred to as "sumps." Additional aspects of example bearings are disclosed in and discussed with reference to FIGS. 2 and 3.

One or more frame structures can be provided as part of gas turbine engine 10 to house and secure the various components. For example, FIG. 1 depicts a fan frame 15, a turbine center frame 17 and a turbine rear frame 19. A first example vibration sensor 100a is located on the outside of fan frame 15. A second example vibration sensor 100b is located on the outside of turbine center frame 17. A third example vibration sensor 100c is located on the outside of turbine rear frame. Providing a sensor on the outside of a frame structure can be useful to sense vibrations that can be processed and analyzed to directly monitor turbine unbalance as well as to indirectly monitor combustor dynamics. The location of vibration sensor 100b on a frame structure near to and downstream from the combustor 22 can be useful to detect pressure pulsations generated within the combustor 22.

Additional or alternative locations for placement of vibration sensors that can directly monitor turbine unbalance as well as indirectly monitor combustor dynamics can be provided relative to turbine bearings, which are often quite close to the rotor and corresponding shaft components. The frame structures 15, 17, 19 of FIG. 1 often have very stiff connections down to the bearings, which make them an ideal alternative. FIGS. 2 and 3 depict specific examples of vibration sensor placement relative to bearings.

FIG. 2 depicts a first set of example locations for a vibration sensor positioned within a gas turbine engine relative to rolling-element bearings. More particularly, FIG. 2 shows a front sump 28 of the engine 10 in more detail. The forward end of the outer shaft 26 is carried by a ball forward bearing 32 and a roller aft bearing 34 which in common nomenclature are referred to as the "3B bearing" and the "3R bearing," respectively denoting their location and type. A static annular frame member referred to as a fan hub frame 36 surrounds the forward and aft bearings 32 and 34. The forward bearing 32 is connected to the fan hub frame 36 by a forward spring bearing cage 38, and the aft bearing 34 is connected to the fan hub frame 36 by an aft spring bearing cage 40. A stationary damper housing 42 with a cylindrical inner surface 44 surrounds the aft bearing 34. In some examples (as illustrated), a vibration sensor 100d can be positioned within the front sump 28 of engine 10 proximate to the ball forward bearing, or 3B bearing 32. In other examples, (as illustrated), a vibration sensor 100e can be positioned proximate to the roller aft bearing, or 3R bearing 34.

FIG. 3 depicts a second set of example locations for a vibration sensor positioned within a gas turbine engine relative to rolling-element bearings. More particularly, FIG. 3 shows an aft sump 58 of the engine 10 in more detail. The aft end 60 of the outer shaft 26 is carried by a bearing 62 which is referred to as the "4R bearing," denoting its location and type. The outer race 64 of the bearing 62 is attached to a static annular frame member 66 of the engine 10. The frame member 66 has a main body portion 68 that extends in a generally radial direction. A stationary seal arm 70 extends axially aft from the main body portion 68. The distal end of the stationary seal arm 70 includes a number of annular seal teeth 72 which extend radially outwards, and at the extreme end, an annular sealing surface 74. The aft end 76 of the inner shaft 18 extends aft of the outer shaft 26 and is mounted for rotation in a rear frame structure 78 of the engine by a rolling element bearing 80. The inner shaft 18 has a disk 82 extending generally radially outward from it. The disk 82 extends between the inner shaft 18 and the LP turbine 16 (see FIG. 1) and transmits torque between the LP turbine 16 and the inner shaft 18. In some examples (as illustrated), a vibration sensor 100f can be positioned within the aft sump 58 of engine 10 proximate to the 4R bearing 62. In other examples, (as illustrated), a vibration sensor 100g can be positioned proximate to the roller element bearing 80.

While the illustrated engine 10 depicted in FIGS. 1-3 is a high-bypass turbofan engine, the disclosed technology can be equally applicable to turboprop, turbojet, and turboshaft engines, as well as turbine engines used for other vehicles or in stationary applications. Other commercial engines can have bearings and frames arranged in different configurations than illustrated in FIGS. 1-3, while still choosing bearing and/or frame locations for the vibration sensors used in accordance with the disclosed techniques. It should also be appreciated that the turbine engines incorporating the disclosed indirect combustor dynamics monitoring technology can be employed for use in a variety of applications, including turbine engines in aircraft. When used in aircraft applications, advantages can be achieved including enhanced detection of engine events in real time, including both turbine unbalance parameters as well as combustor dynamics events. Utilizing dedicated sensor hardware and control units to accomplish multiple objectives can reduce weight and cost of required components.

Figure 4:
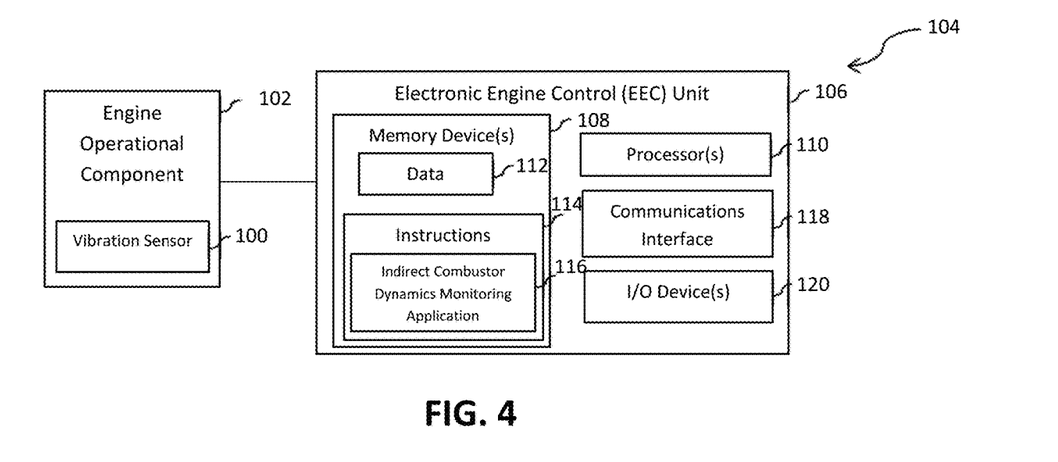
FIG. 4 is a schematic block diagram of example system components for implementing indirect combustor dynamics monitoring technology according to various embodiments of the present subject matter.

FIG. 4 depicts example system components implemented onboard an aircraft or within another gas turbine engine application according to example embodiments of the present disclosure. The system 104 can include one or more vibration sensors 100 and one or more electronic engine control (EEC) units 106.

Vibration sensor 100 can be a vibration-sensing accelerometer such as a piezoelectric accelerometer or other sensor for measuring and recording dynamic changes in mechanical variables of engine operational component 102, including shock, vibration and the like. Vibration sensor 100 can serve as a transducer that converts the sensed vibrations from mechanical energy into an electrical signal that is measured and processed as disclosed herein to identify various turbine parameters. In some examples, vibration sensor 100 can include an amplifier to enhance the acquired signal data before being relayed to EEC unit 106. Each vibration sensor 100 can be positioned relative to an engine operational component 102, such as the frames, bearings or other operational components variously depicted in FIGS. 1-3 or in other specific gas turbine engine configurations. Placement of vibration sensor 100 relative to engine operational component 102 can be designed and configured such that the vibrational sensing components of vibration sensor 100 can detect multiple parameters, including both turbine unbalance as well as combustor dynamics events.

EEC unit 106 can function as a computing device(s) for performing various functions disclosed herein, and can include one or more memory devices 108 and one or more processors 110. The one or more processors 110 can include any suitable processing device, such as a microprocessor, microcontroller, integrated circuit, logic device, or other suitable processing device. The one or more memory devices 108 can include one or more computer-readable media, including, but not limited to, non-transitory computer-readable media, RAM, ROM, hard drives, flash drives, or other memory devices.

The one or more memory devices 108 can store information accessible by the one or more processors 110, including data 112 that can be accessed by the processor(s) 110. The data 112 can include, for instance, data acquired from the vibration sensor 100. Computer-readable instructions 114 can be any set of instructions that when executed by the one or more processors 110, cause the one or more processors 110 to perform operations. The instructions 114 can be written in any suitable programming language or can be implemented in hardware. In some embodiments, the instructions 114 can be executed by the one or more processors 110 to cause the one or more processors 110 to perform operations, such as the operations embodied by an indirect combustor dynamics monitoring application 116.

Referring still to FIG. 4, EEC unit 106 also can include one or more communications interfaces 118 for communicatively networking the EEC unit 106 to one or more local or remote systems via a data bus or combination of wired and/or wireless communication links. Example networked systems can include gas turbine engine systems, fuel delivery systems, flight control computers, aircraft propulsion systems, digital control systems, throttle systems, inertial reference systems, flight instrument systems, engine control systems, auxiliary power systems, fuel monitoring system, engine vibration monitoring systems, communications systems, flap control systems, flight data acquisition systems, and other systems.

EEC unit 106 also can include one or more input/output (I/O) devices 120. Example I/O devices 120 configured to accommodate input controls can include a keyboard, touchscreen, interface panel, microphone, eye controller, or other device capable of receiving instructions from an operator of an aircraft. Example I/O devices configured to provide an output interface can include a display, speaker or other device configured to provide information generated or received by the EEC unit 106. In some examples, output device 120 can include a primary flight display, a multipurpose control display unit, or other suitable flight display commonly included within a cockpit of an aircraft. By way of non-limiting example, an output device 120 can be used for displaying event triggers indicative of combustion dynamics event occurrence and/or engine maintenance or inspection requirements based on detected combustion dynamics events.

Figure 5:
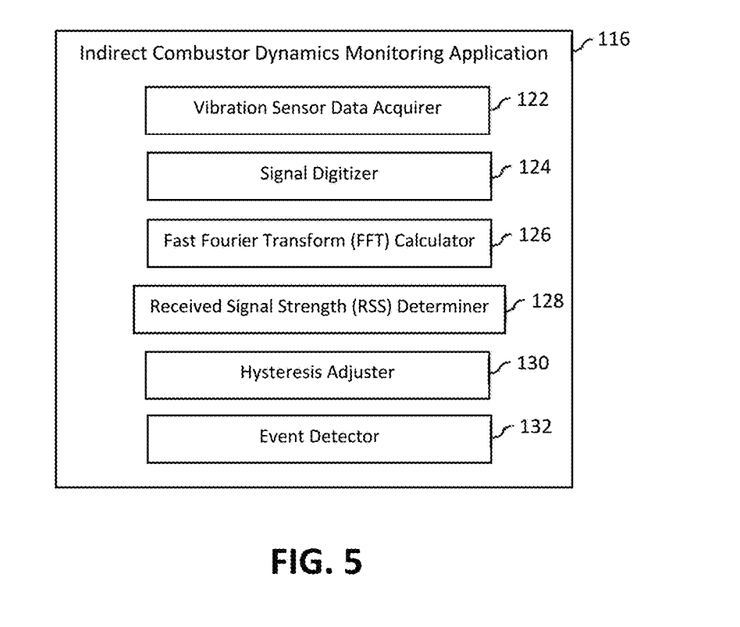
FIG. 5 is a schematic block diagram of example algorithm components of an indirect combustor dynamics monitoring application according to various embodiments of the present subject matter.
Figure 6:
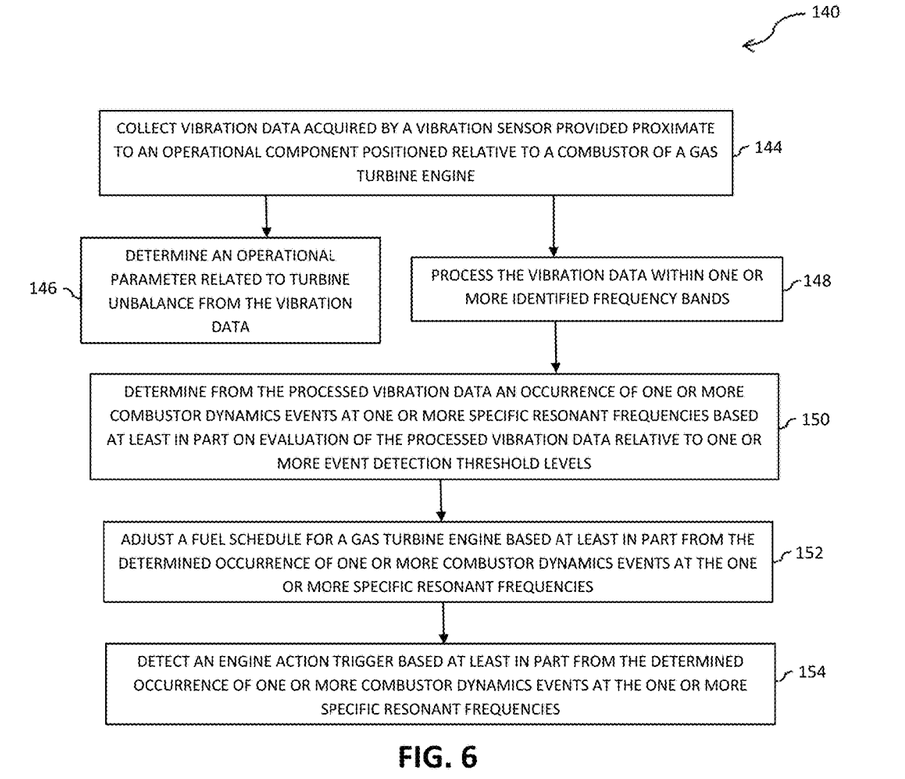
FIG. 6 is a flow diagram of an example method for implementing indirect combustor dynamics monitoring technology according to various embodiments of the present subject matter.
Figure 7:
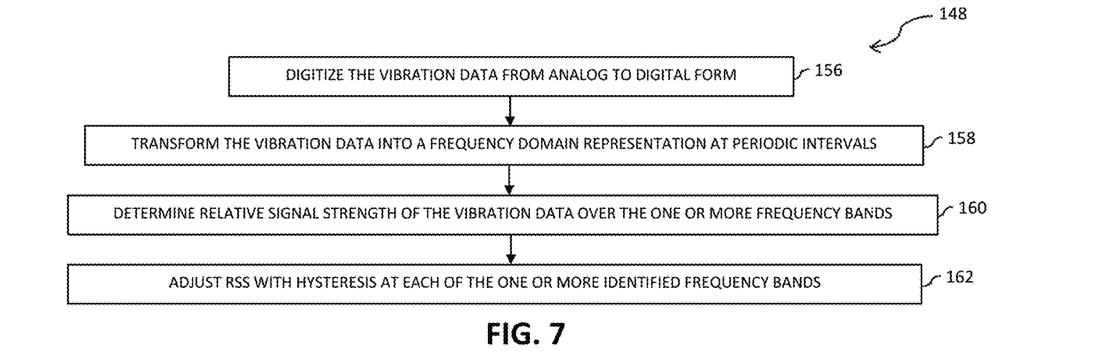
FIG. 7 is a flow diagram of more particular aspects of an example method for implementing indirect combustor dynamics monitoring technology according to various embodiments of the present subject matter.

FIG. 5 depicts an example combustor dynamics monitoring application 116 in more detail, including example software and/or hardware modules for implementing algorithms or other features described in FIGS. 6 and 7. In one particular example, indirect combustor dynamics monitoring application 116 includes a vibration sensor data acquirer 122, a signal digitizer 124, Fast Fourier Transform (FFT) calculator 126, Received Signal Strength (RSS) determiner 128, hysteresis adjuster 130 and event detector 132.

FIGS. 6 and 7 depict flow diagrams of respective aspects of an example method (140) for indirect monitoring of combustor dynamics in a gas turbine engine according to example embodiments of the present disclosure. FIGS. 6 and 7 can be implemented by a dedicated controller unit or computing device, such as EEC unit 106 depicted in FIG. 4, particular aspects of which are further represented in the indirect combustor dynamics monitoring application 116 of FIG. 5. In addition, FIGS. 6 and 7 depict steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

FIG. 6 depicts a flow diagram of an example method (140) for indirect monitoring of combustor dynamics in a gas turbine engine. Method (140) can include collecting vibration data at (144) acquired by a vibration sensor. The vibration sensor can be proximate to an operational component of a gas turbine engine. The operational component on which the vibration sensor is provided can be positioned relative to a combustor portion of the gas turbine engine so that vibrational levels associated with combustor dynamics can be detected. In some examples, the vibration sensor can be mounted with the additional goal of detecting additional operational parameters of the turbine including turbine unbalance, misalignment or other source of machine vibration within the turbine. Positioning of a vibration sensor in one or more enhanced locations optionally can be determined using prior, ground-based engine tests with multiple sensors in different locations. By considering the quality of vibration data from multiple test sensors, preferred sensor placement locations can be identified for future installation within an aircraft or fleet of aircraft.

Referring still to FIG. 6, method (140) can include one or more application paths for evaluating the vibration data collected at (144). In some examples, vibration data collected at (144) can be used to directly determine at (146) one or more operational parameters related to turbine unbalance as well as process at (148) and indirectly determine at (150) the occurrence of one or more combustor dynamics events. When turbine unbalance is determined at (146), monitoring capabilities can help identify when excessive mechanical forces are present in the bearing area of the rotor components of a turbine engine. These excessive forces can reduce overall turbine lifespan, and so determination of associated parameters at (146) can help to characterize engine component health and identify when maintenance tasks need to be implemented.

Referring now to FIG. 7, more particular aspects of processing (148) the vibration data collected at (144) are described. In general, processing (148) serves to help isolate specific resonant frequencies from background signals obtained by the vibration sensor. The vibration data can be digitized at (156) by translating the analog transducer output of the vibration sensor into a digital form suitable for subsequent signal processing. Digitized vibration data then can be transformed at (158) from a time domain representation into a frequency domain representation. In one example, signal transformation at (158) can involve performing a Fast Fourier Transform (FFT) at periodic intervals. An example representation of vibration data after being transformed at (158) is depicted in the graphical illustration of FIG. 8, which provides an example spectrogram 170 of signal frequency plotted versus time in milliseconds.

Figure 8:
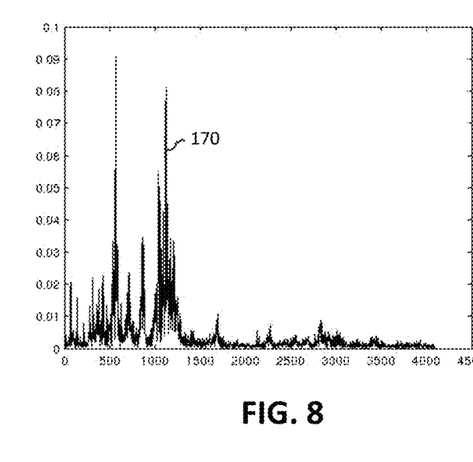
FIG. 8 is a graphical depiction of example signal data processed using an FFT calculator component of an indirect combustor dynamics monitoring application according to various embodiments of the present subject matter.
Figure 9:
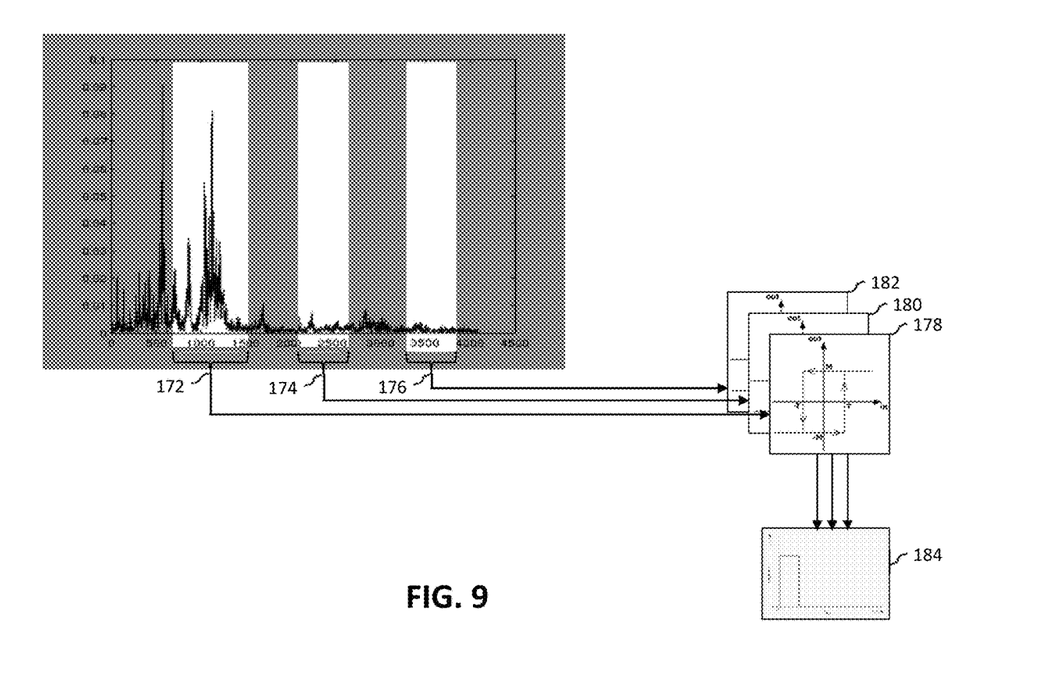
FIG. 9 is a graphical depiction of example signal data processed using RSS calculator, hysteresis calculator, and event detector components of an indirect combustor dynamics monitoring application according to various embodiments of the present subject matter.

Relative Signal Strength (RSS) can then be determined at (160) for the transformed vibration data. RSS can be determined at (160) over one or more particular frequency bands, such as depicted in FIG. 8 at a first frequency band of interest 172, second frequency band of interest 174, and third frequency band of interest 174. It should be appreciated that although FIG. 9 depicts three frequency bands of interest, any total number of frequency bands can be chosen. In addition, the location and bandwidth over which RSS is determined at (160) can vary. In some examples, these frequency bands are chosen based on known resonant modes for a turbine combustor. In other examples, frequency bands are selected at predetermined intervals or at randomly determined frequency selections.

Hysteresis adjustments can then be implemented at (162) at each of the one or more identified frequency bands for which RSS was determined at (160). Hysteresis adjustments at (162) can involve modifying the RSS signals determined at (160) to prevent unwanted event detection at (164) by compensating for noise in the RSS signals present from contact bounce in acquired vibration data. Hysteresis calculations and corresponding signal adjustments can be implemented at (162) for each separate frequency band of interest for which RSS is determined at (160). As depicted in FIG. 9, a first hysteresis adjustment 178 is performed for RSS values obtained over first frequency band of interest 172. A second hysteresis adjustment 180 is determined for RSS values obtained over second frequency band of interest 174, and a third hysteresis adjustment 182 is determined for RSS values obtained over third frequency band of interest 176.

After signal processing at (148) within the one or more frequency bands of interest, the processed vibration data is evaluated at (150) to determine an occurrence of one or more combustion dynamics events. Determination at (150) can occur by evaluating the RSS values determined at (160) and optionally adjusted with hysteresis at (162) relative to one or more event detection threshold levels. Event detection at (150) can include tracking just the occurrence of a combustor dynamics event. Additionally or alternatively, event detection at (150) can also identify the specific resonant frequency or frequencies at which such events occur. Detailed frequency data can be collected on maximum pressure or vibration levels due to specific dynamic modes, for example, for each flight during which an aircraft gas turbine engine is operated. Identification of precise resonant frequencies can assist in identifying which resonant mode is being excited within a combustor and identifying the appropriate response needed for subsequent engine improvement.

Figure 10:
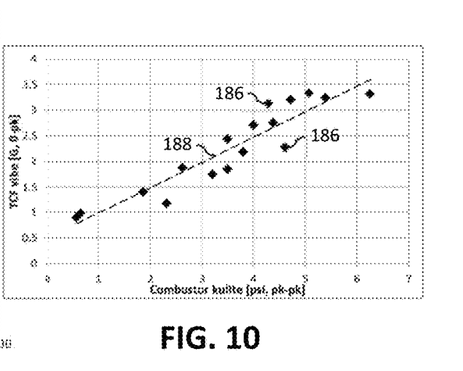
FIG. 10 is a graphical depiction of vibration data plotted relative to combustor dynamics according to various embodiments of the present subject matter.

Event detection determined at (150) is depicted in FIG. 9 at signal block 184. The event detection threshold levels can be separately identified for each frequency band of interest. Example aspects of how to select an event detection threshold level are represented in FIG. 10. FIG. 10 illustrates vibration data for a vibration-sensing accelerometer placed on a turbine center frame plotted against levels of combustor kulite obtained directly within a turbine combustor. Combustor kulite corresponds to a direct measurement of combustion dynamics using a differential pressure sensor to measure flow instabilities within a combustor. Example data points 186 plot the peak vibrational amplitude in G's of acceleration versus peak-to-peak amplitude of combustor kulite in pounds per square inch (psi). Gathered data points 186 can be used to fit a line 188 that represents a threshold level for event detection. Subsequently obtained and processed vibration data then can be determined as corresponding to combustor dynamics events when the vibration levels exceed the established threshold level. In the disclosed systems and methods, direct combustor kulite measurement sensors are not typically provided, but only used to help set event detection threshold levels so that systems having only vibration data can be used to indirectly calculate combustor dynamics.

Referring again to FIG. 6, combustor dynamics events determined to have occurred at (150) then can be used to improve gas turbine engine operations in one or more ways. In one example, the determined occurrence of one or more combustor dynamics events at one or more specific resonant frequencies can be used in a closed-loop approach to adjust a fuel schedule for the gas turbine engine at (152). In this example, control software can actively modify a fuel schedule if analyzed vibrational data indicates that dynamic pressure limits are exceeded within the combustor. This active modification of a combustor fuel schedule can provide individualized tuning of the engine as it changes over time. In another example, the determined occurrence of one or more combustor dynamics events as well as collected resonant frequency data can be used in an open-loop approach to detect one or more engine action trigger events at (154). Engine action trigger events can indicate a need to implement some future action relative to the engine, such as a future fuel schedule improvement and/or engine inspection to evaluate potential damage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for indirect monitoring of combustor dynamics in a gas turbine engine, comprising:
    collecting, by one or more processors, vibration data acquired by a vibration sensor, the vibration sensor being mounted on a bearing or a frame of the gas turbine engine aft of a combustor of the gas turbine engine;
    processing, using the one or more processors, the vibration data at one or more identified frequency bands to generate processed vibration data;
    determining, using the one or more processors, from the processed vibration data an occurrence of one or more combustor dynamics events at one or more specific resonant frequencies based at least in part on evaluation of the processed vibration data relative to one or more event detection threshold levels; and
    operating the gas turbine engine in response to the determined occurrence of one or more combustor dynamics events at one or more specific resonant frequencies, comprising adjusting, by the one or more processors, a fuel schedule for the gas turbine engine based at least in part from the determined occurrence of one or more combustor dynamics events at one or more specific resonant frequencies.

2. The method of claim 1, further comprising detecting, by the one or more processors, an engine action trigger event indicating an engine inspection is required based at least in part from the one or more combustor dynamics events at one or more specific resonant frequencies.

3. The method of claim 1, wherein processing, by the one or more processors, the vibration data further comprises transforming, by the one or more processors, the vibration data into a frequency domain representation at periodic intervals.

4. The method of claim 3, wherein processing, by the one or more processors, the vibration data at one or more identified frequency bands further comprises determining, by the one or more processors, a signal strength of the vibration data over the one or more identified frequency bands.

5. The method of claim 4, wherein processing, by the one or more processors, the vibration data at one or more identified frequency bands further comprises adjusting, by the one or more processors, the signal strength with hysteresis, wherein a different hysteresis adjustment is separately made to the signal strength for each of the one or more identified frequency bands.

6. The method of claim 1, wherein the vibration sensor is mounted on the bearing of the gas turbine engine.

7. The method of claim 1, wherein the vibration sensor is mounted on the frame of the gas turbine engine, and wherein the frame is a turbine frame.

8. The method of claim 1, further comprising determining, by the one or more processors, an operational parameter related to turbine unbalance from the vibration data acquired by the vibration sensor.

9. A system for indirect monitoring of gas turbine combustor dynamics, comprising:
a vibration sensor located proximate to an operational component positioned relative to a combustor of a gas turbine engine, the vibration sensor being mounted on one of a bearing, a turbine frame, and a fan frame of the gas turbine engine, the vibration sensor being configured to sense vibrations;
an electronic engine control unit comprising one or more processors and one or more memory devices, the one or more memory devices storing instructions that when executed by the one or more processors cause the one or more processors to perform operations, the one or more processors of the electronic engine control unit configured to:
collect vibration data acquired by the vibration sensor;
transform the vibration data into a frequency domain representation at periodic intervals;
determine a signal strength of the vibration data over one or more identified frequency bands;
determine an occurrence of a combustor dynamics event at one or more specific resonant frequencies based at least in part on evaluation of the signal strength relative to one or more event detection threshold levels; and
cause the gas turbine engine to operate in response to the determined occurrence of one or more combustor dynamics events at one or more specific resonant frequencies by adjusting a fuel schedule for the gas turbine engine based at least in part from the determined occurrence of one or more combustor dynamics events at one or more specific resonant frequencies.

10. The system of claim 9, wherein the one or more processors of the electronic engine control unit are further configured to: detect an engine action trigger event indicating an engine inspection is required based at least in part from the determined occurrence of one or more combustor dynamics events at one or more specific resonant frequencies.

11. The system of claim 9, wherein the one or more processors of the electronic engine control unit are further configured to: adjust the signal strength with hysteresis at each of the one or more identified frequency bands, and wherein a different hysteresis adjustment is separately made to the signal strength for each of the one or more identified frequency bands.

12. The system of claim 9, wherein the vibration sensor is mounted on the fan frame.

13. The system of claim 9, wherein the one or more processors of the electronic engine control unit are further configured to: determine an operational parameter related to turbine unbalance from the vibration data acquired by the vibration sensor.

14. One or more tangible, non-transitory computer-readable media storing computer-readable instructions that when executed by one or more processors cause the one or more processors to perform operations, the one or more processors being configured to:
collect vibration data acquired by a vibration sensor provided proximate to an operational component positioned relative to a combustor of a gas turbine engine, the vibration sensor being mounted on one of a bearing, a turbine frame, and a fan frame of the gas turbine engine;
transform the vibration data into a frequency domain representation at periodic intervals;
determine a signal strength of the vibration data over one or more identified frequency bands;
determine an occurrence of a combustor dynamics event at one or more specific resonant frequencies based at least in part on evaluation of the signal strength relative to one or more event detection threshold levels; and
cause the gas turbine engine to operate in response to the determined occurrence of the combustor dynamics events at one or more specific resonant frequencies by adjusting a fuel schedule for the gas turbine engine based at least in part from the determined occurrence of one or more combustor dynamics events at one or more specific resonant frequencies.

15. The computer-readable media of claim 14, wherein the one or more processors are further configured to: detect an engine action trigger event indicating a need to adjust a fuel schedule of the gas turbine engine based at least in part from the determined occurrence of one or more combustor dynamics events at one or more specific resonant frequencies.

16. The computer-readable media of claim 14, wherein the vibration sensor comprises an accelerometer that is mounted on the bearing, the bearing being positioned aft of the gas turbine engine.

17. The computer-readable media of claim 14, wherein the one or more processors are further configured to: determine an operational parameter related to turbine unbalance from the vibration data acquired by the vibration sensor.

* * * * *